United States Patent [19]
Wilkinson

[11] Patent Number: 6,006,507
[45] Date of Patent: Dec. 28, 1999

[54] DUAL PRESSURE RELEASE ASSEMBLY FOR A FRUIT HARVESTING MACHINE

[76] Inventor: Stephen Harold Wilkinson, 29 Lakeside Cir., Pahokee, Fla. 33476

[21] Appl. No.: 08/931,108

[22] Filed: Sep. 15, 1997

Related U.S. Application Data

[63] Continuation-in-part of application No. 08/545,480, Oct. 19, 1995, Pat. No. 5,666,795.

[51] Int. Cl.[6] .................................................. A01D 46/00
[52] U.S. Cl. ............................ 56/328.1; 56/330
[58] Field of Search .................... 56/328.1, 330, 56/329, 14.8

[56] References Cited

U.S. PATENT DOCUMENTS

| | | |
|---|---|---|
| 3,421,304 | 1/1969 | Phillips, Jr. . |
| 3,636,688 | 1/1972 | Fontan et al. ............................... 56/330 |
| 3,822,537 | 7/1974 | Sell ........................................... 56/330 |
| 4,163,356 | 8/1979 | Robbins et al. ......................... 56/328.1 |
| 4,236,371 | 12/1980 | Claxton ...................................... 56/330 |
| 4,377,064 | 3/1983 | Peterson ................................. 56/328.1 |
| 5,421,146 | 6/1995 | Visser ..................................... 56/328.1 |

*Primary Examiner*—H. Shackelford

[57] ABSTRACT

A coupling assembly is provided which allows for a dual pressure release during impaction of an obstruction during insertion of a picking arm into a canopy of a fruit tree. A first yielding occurs when a predetermined first level of resistance is encountered. If the obstruction is cleared and the resistance pressure falls below the first level of resistance the picking arm is returned to the normal deployed position. If the resistance level continues to climb and exceeds a predetermined second level of resistance the coupling assembly releases the arm to reduce the resistance pressure previously obtained while preventing any further resistance pressure from being generated. This acts to significantly reduce the opportunity that damage will occur to either the machinery or to the fruit tree. The possibility of multiple picking members is explained.

12 Claims, 4 Drawing Sheets

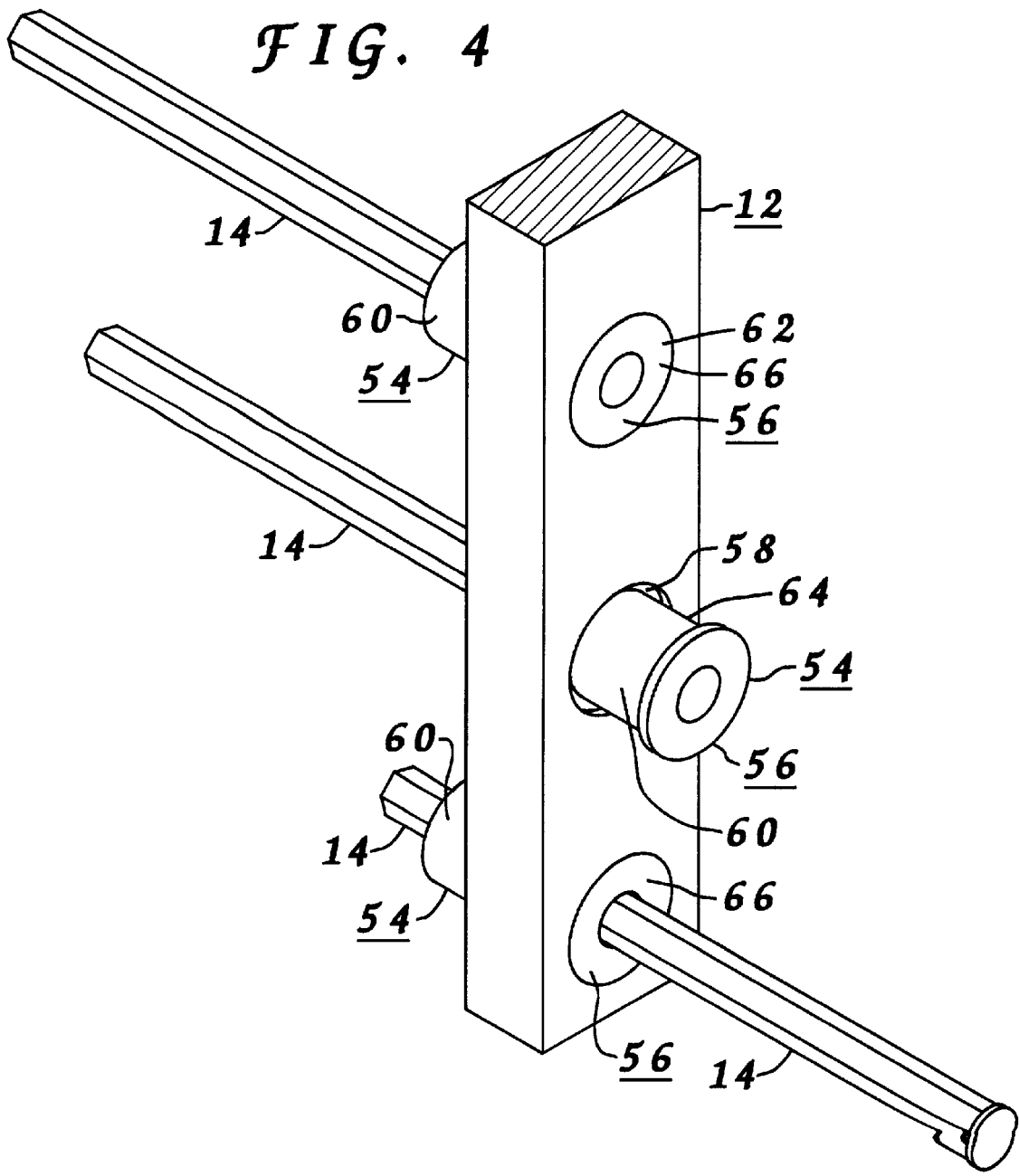

DUAL PRESSURE RELEASE ASSEMBLY FOR A FRUIT HARVESTING MACHINE

CROSS-REFERENCES

This application is a continuation-in-part of Ser. No.: 08/545,480 filed Oct. 19, 1995, entitled "Citrus Harvesting Machine", now U.S. Pat. No. 5,666,795. This application is incorporated herein by this reference.

BACKGROUND

1. Field of the Invention

Generally, the invention relates to providing a release mechanism for a picking arm during a picking cycle. More specifically, the invention relates to such a release mechanism having dual pressure yielding means.

2. Description of the Prior Art

Mechanical harvesting of fruit from trees has been attempted using various designs of machines. One class of machines provide for picking members to be inserted and withdrawn from a canopy of the tree. A sub-class of these machines employ picking arms which are displaced generally along there longitudinal length during an extension cycle into the canopy of the tree. It has long been recognized that during such extension into the canopy of the tree that the distal end of a respective picking arm may impact a portion of the tree which produces resistance to continued extension. During such an impaction damage may occur either to the tree, to the machine, or a portion thereof, or to both if continued extension occurs. Various attempts have been made to provide for a release or a yielding of the extension pressure produced by the machine.

These attempts may be identified in three main groups. The first group have resulted in a release within a guiding channel wherein some form of elastic member, generally springs, produce increasing resistance as the picking arm is displaced further from a respective deployed position. This group is not desirable primarily due to a tendency of the picking arm to move violently within the guiding channel to the deployed position when resistance is suddenly eliminated, as exampled by slipping off of an impacted branch. The second group have resulted in a complete release of the respective picking arm from a guide member where little pressure is applied to move the picking arm into the canopy. This group is not desirable primarily due to a tendency to eliminate, or significantly reduce, any opportunity of the picking arm to fulfill the primary function which is to penetrate the canopy and move the picking member(s) into position where engagement of fruit may occur. The third group is limited to machines having a plurality of picking arms. This group provides for all deployed picking arms to operate in a synchronized manner. When the totality of arms meet a predetermined level of resistance, extension of the assembly pauses and withdrawal commences regardless of the extent of the point within the extension portion of the cycle.

Various attempts have been made to provide a devices to provide for a yielding of a picking arm during penetration insertion of a picking arm into a canopy of a fruit tree. These attempts have been less efficient than desired. As such, it may be appreciated that there continues to be a need for a dual pressure yielding assembly which may reset to a deployed position in the event that a resistance level initially exceeds a first level of resistance then falls below the first level of resistance prior to reaching a second level of resistance. The present invention substantially fulfills these needs.

SUMMARY

In view of the foregoing disadvantages inherent in the known types of devices to provide for a yielding of the picking arms during penetration of a canopy of a fruit tree, your applicant has devised a method of providing for dual pressure yielding of a picking arm relative to a displacement member. The displacement member produces a reciprocating displacement of the picking arm attached thereto. This reciprocating displacement occurs in a series of repetitive cycles with each cycle having an extension period and a retraction period. The picking arm has three possible orientations relative to the displacement member. These are a deployed orientation, a yielding orientation and a released orientation. Deployment positioning means are provided to retain the picking arm in the deployed orientation relative to the displacement member. Displacement yield means, or picking arm yield means are provided for a first yielding of the picking arm from the deployed orientation into the yielding orientation in response to a resistance pressure where that resistance pressure exceeds a first level of resistance. Redeployment means are provided to return the picking arm to the deployed orientation from the yielding orientation if the resistance pressure falls below the first level of resistance prior to reaching a second level of resistance. Displacement release means, or displacement member release means, are provided for a second yielding of the picking arm from the yielding orientation into the released orientation in response to the resistance pressure exceeding the second level of resistance. Reset means are provided for the picking arm to be returned to the deployed orientation from the released orientation prior to the reciprocating displacement beginning a subsequent extension period.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for an attachment assembly have differing yielding responses to varying degrees of resistance pressure.

Other object include;

a) to provide for a first yielding in response to exceeding a first level of resistance pressure.

b) to provide for a second yielding in response to exceeding a second level of resistance pressure.

c) to provide for a return to a normal deployed position from the first yielding if the resistance pressure falls below the first level of resistance pressure prior to exceeding the second level of resistance pressure.

d) to provide for a full release of the picking arm in response to exceeding the second level of resistance pressure.

e) to provide for a repositioning of the coupling assembly following the full release of the picking arm for placement in the normal deployed position prior to beginning a subsequent extension period.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Figure 1:
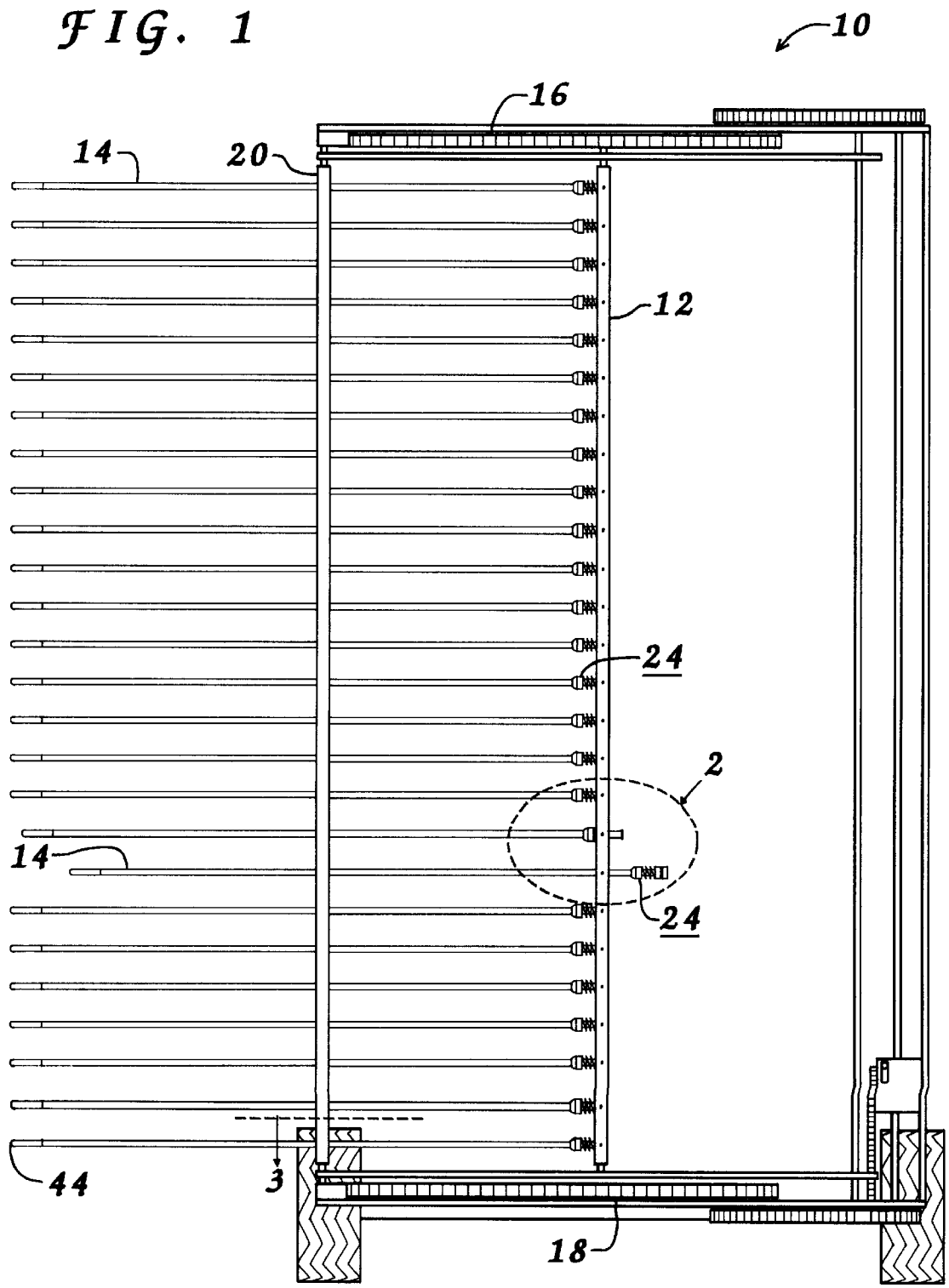
FIG. 1 is an elevational view of a fruit harvesting machine.
Figure 2:
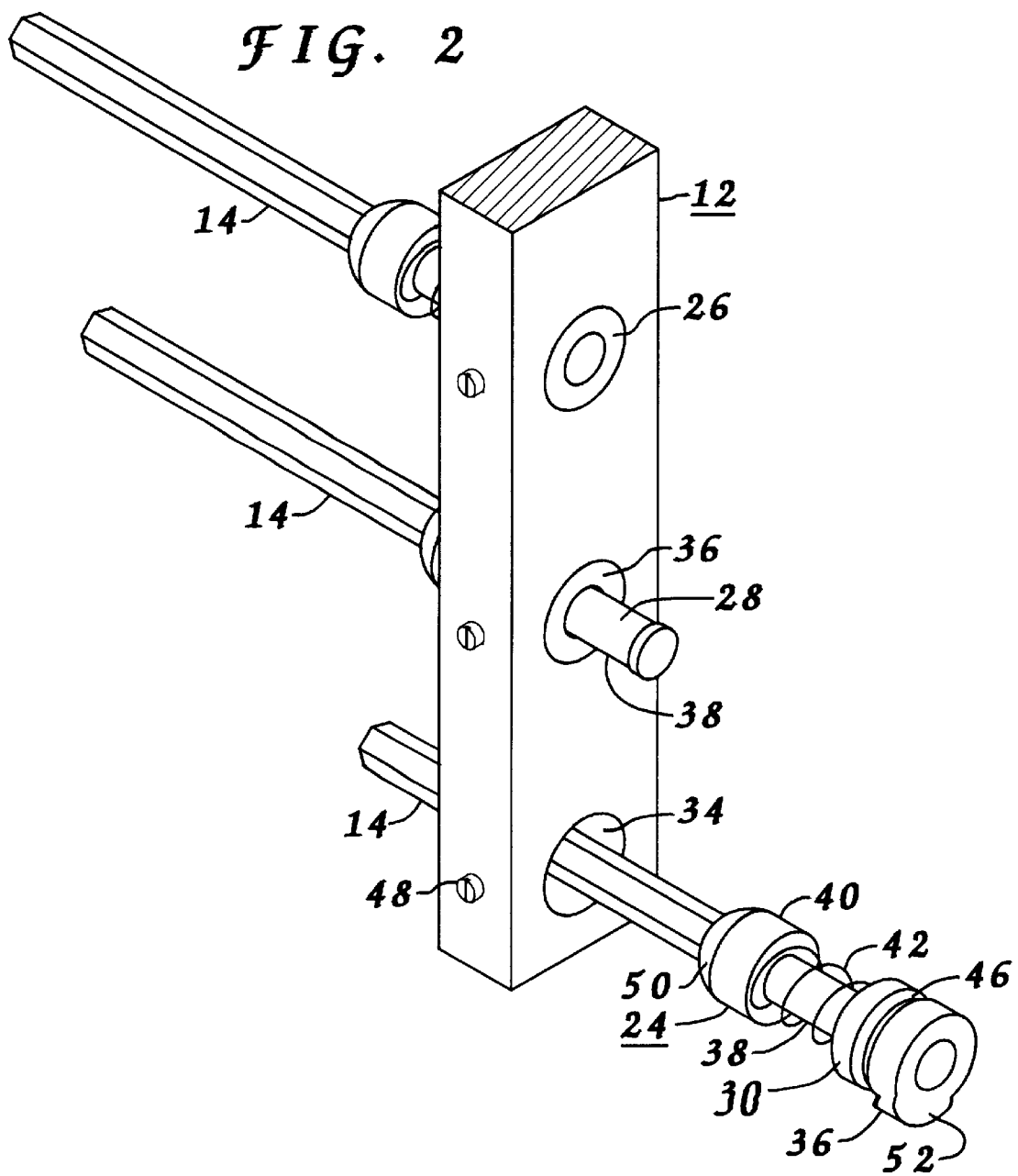
FIG. 2 is a sectional view as taken from the section indicator '2' shown in FIG. 1.
Figure 3:
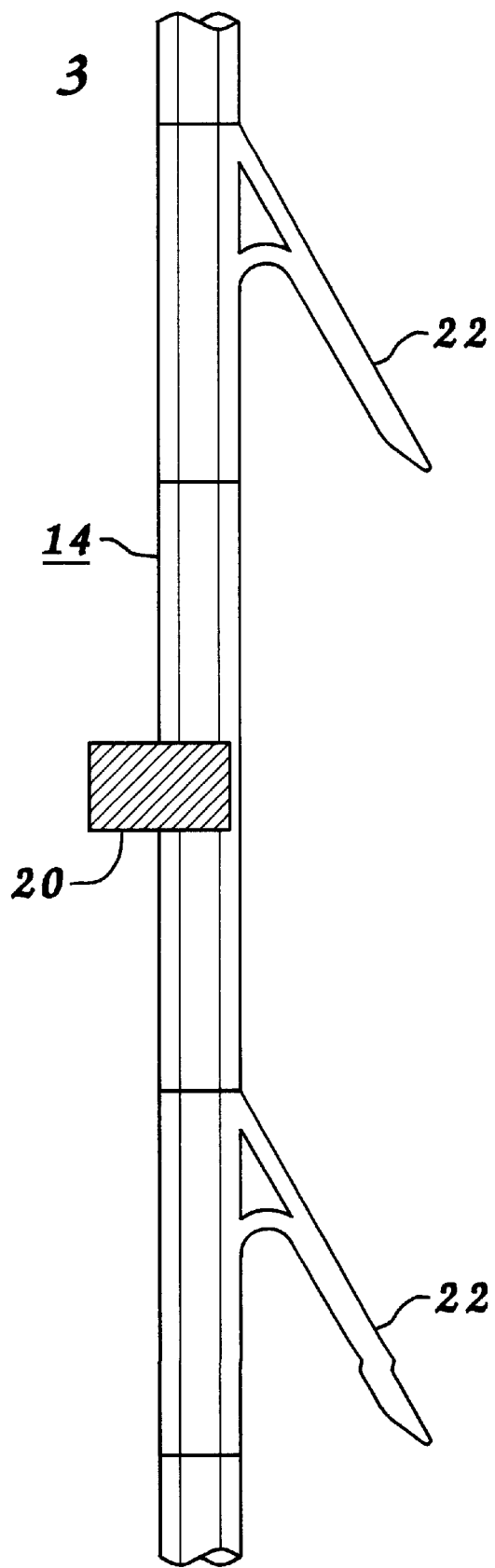
FIG. 3 is a sectional view as taken from the section line '3' shown in FIG. 1.

Referring now to the drawings where like reference numerals refer to like parts throughout the various views. FIG. 1 through FIG. 3 depicts a fruit harvesting machine 10, or portions thereof, having a displacement member 12 attached thereto to provide for a reciprocating displacement of a plurality of picking arms 14. Displacement member 12 is moved in repetitive cycles by an upper displacement drive 16 and a lower displacement drive 18 which are linked to operate in a synchronized manner. Deployment positioning means are provided to retain the picking arm in the deployed orientation relative to the displacement member. Each picking arm 14 may be retained only by displacement member 12. Preferably, each picking arm 14 engages a guide member 20, see FIG. I and FIG. 3, which ensures a proper elevational alignment of each picking arm 14 during each repetitive cycle. Each repetitive cycle has an extension period and a retraction period during which time span penetration and withdraw from a canopy of a fruit tree, not shown, may occur respectively. Each picking arm 14 will have at least one, and preferably more, picking members 22, see FIG. 3, extending therefrom to engage fruit, not shown, during a respective repetitive cycle.

During the extension period picking arm 14 may encounter an obstruction, not shown, which impedes ordinary advance of picking arm 14. FIG. 1 and FIG. 2 depicts a coupling assembly 24 capable of dual resistance yielding. A deployed orientation 26 is depicted as is routine in the absence of significant resistance. Displacement yield means, or picking arm yield means, are provided for a first yielding of the picking arm from the deployed orientation into the yielding orientation in response to a resistance pressure where that resistance pressure exceeds a first level of resistance. A yield orientation 28 is depicted as occurs when a resistance pressure is above a first level of resistance. Displacement release means, or displacement member release means, are provided for a second yielding of the picking arm from the yielding orientation into the released orientation in response to the resistance pressure exceeding the second level of resistance. A release orientation 30 is depicted as occurs when the resistance pressure is above a second level of resistance.

Deployed orientation 26 is the normal positioning of picking arm 14 relative to displacement member 12. In this position picking arm 14 advances with displacement member 12 and is capable of penetration of the canopy of the fruit tree. This positioning allows picking member 22 to perform a function of engaging fruit proximate the stem, not shown, and produce a picking pressure to severe the fruit from the tree during the retraction period.

Yield orientation 28 occurs when resistance pressure exceeds the first level of resistance, yet fails to obtain the second level of resistance. This allow for a slight yielding while allowing time for picking arm 14 to become free of the obstruction which is creating the resistance pressure. Redeployment means are provided to return the picking arm to the deployed orientation from the yielding orientation if the resistance pressure falls below the first level of resistance prior to reaching a second level of resistance. If picking arm 14 becomes free, picking arm 14 returns to deployed orientation 26.

Release orientation 30 occurs when resistance pressure exceeds the second level of resistance. In this occasion, coupling assembly 24 releases from displacement member 12. Picking arm 14 is then free from any further displacement which results from movement of displacement member 12 during the extension period. This reduces, or eliminates, the potential for damage to fruit harvesting machine 10, or any portion thereof, as well as the fruit tree.

Displacement member 12 has an aperture 34 therethrough for each picking arm 14. Coupling assembly 24 mounts within aperture 34 while in deployed orientation 26 and yield orientation 28. Coupling assembly 24 comprises a mount 36, a shaft 38, a block 40 and a spring 42. Shaft 38 rigidly extends from block 40 while slidably engaging mount 36. Spring 42 biases mount 36 to remain spaced from block 40 in the absence of pressure along picking arm 14 from a distal end 44, see FIG. 1.

Mount 36 has a trench 46 which mates with a portion, not shown, of a biased shaft 48 to retain block 40 within aperture 34 in the absence of significant pressure along picking arm 14 from distal end 44. When a first level of resistance is met spring 42 compresses and shaft 38 moves within mount 36 to allow picking arm 14 to be longitudinally displaced relative to displacement member 12. When a second level of resistance is met biased shaft 48 releases mount 36 from aperture 34.

Reset means are provided for the picking arm to be returned to the deployed orientation from the released orientation prior to the reciprocating displacement beginning a subsequent extension period. Block 40 has a taper 50 which allows coupling assembly 24 to be reseated within aperture 34 when pressure is applied to an end 52 of mount 36. Such pressure is easily applied commensurate with the transition between the retraction period and the extension period of the reciprocating displacement of displacement member 12 by positioning stationary structure on fruit harvesting machine 10 immediately behind displacement member 12.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A picking arm attachment assembly to provide for attachment of a picking arm relative to a displacement member, the picking arm having a deployed orientation, a yielding orientation and a released orientation with all orientations relative to the displacement member, the displacement member to provide for producing a reciprocating displacement of the picking arm, the reciprocating displacement occurring in repetitive cycles with each cycle generally horizontally biased along a path corresponding to a longitudinal length of the picking arm, each cycle of the reciprocating displacement having an extension period and a retraction period, the picking arm attachment assembly comprising:

a) deployed positioning means to provide for the picking arm to be retained in the deployed orientation relative to the displacement member;
   b) displacement yield means to provide for a first yielding of the picking arm relative to the displacement member into the yielding orientation from the deployed orientation in response to a resistance pressure during the extension period of the reciprocating displacement wherein the resistance pressure exceeds a first level of resistance;
   c) redeployment means to provide for the picking arm to return to the deployed position from the yielding orientation if the resistance pressure falls below the first level of resistance prior to reaching a second level of resistance;
   d) displacement release means to provide for a second yielding of the picking arm relative to the displacement member into the released orientation in response to the resistance pressure exceeds the second level of resistance during the extension period of the reciprocating displacement.

2. The picking arm attachment assembly defined in claim 1 further comprising a guide member slidably engaging the picking arm wherein the displacement member and the guide member have a variable spacing during each period of each of the repetitive cycles.

3. The picking arm attachment assembly defined in claim 2 further comprising a picking member extending from the picking arm and wherein the guide member further comprises passage means to provide for the picking member to traverse the guide member during each extension period and during each retraction period.

4. The picking arm attachment assembly defined in claim 1 wherein the displacement member has attached thereon a plurality of picking arm attachment assemblies with each picking arm attachment assembly having attached thereto one picking arm.

5. The picking arm attachment assembly defined in claim 1 wherein the picking arm has a picking member extending therefrom.

6. The picking arm attachment assembly defined in claim 1 wherein the picking arm has a plurality of picking members extending therefrom.

7. A picking arm attachment assembly to provide for attachment of a picking arm relative to a harvesting machine, the picking arm attachment assembly comprising:

a) a displacement member to provide for producing a reciprocating displacement of the picking arm, the reciprocating displacement occurring in repetitive cycles with each cycle generally horizontally biased along a path corresponding to a longitudinal length of the picking arm, each cycle of the reciprocating displacement having an extension period and a retraction period;
   b) a coupling assembly comprising:
      1) a picking arm engagement member to provide for a slidable engagement of the picking arm;
      2) picking arm yield means to provide for the picking arm to be slidably displaced relative to picking arm engagement member in response to a resistance pressure during the extension period of the reciprocating displacement wherein the resistance pressure exceeds a first level of resistance;
      3) a displacement member engagement member to provide for a displaceable engagement of the displacement member;
      4) displacement member release means to provide for the displacement member engagement member to be released relative to the displacement member in response to the resistance pressure during the extension period of the reciprocating displacement wherein the resistance pressure exceeds a second level of resistance.

8. The picking arm attachment assembly defined in claim 7 further comprising a guide member slidably engaging the picking arm wherein the displacement member and the guide member have a variable spacing during each period of each of the repetitive cycles.

9. The picking arm attachment assembly defined in claim 8 further comprising a picking member extending from the picking arm and wherein the guide member further comprises passage means to provide for the picking member to traverse the guide member during each extension period and during each retraction period.

10. The picking arm attachment assembly defined in claim 7 wherein the displacement member has attached thereon a plurality of coupling assemblies with each coupling assembly having attached thereto one picking arm.

11. The picking arm attachment assembly defined in claim 7 wherein the picking arm has a picking member extending therefrom.

12. The picking arm attachment assembly defined in claim 7 wherein the picking arm has a plurality of picking members extending therefrom.

* * * * *